United States Patent [19]

Peterson

[11] Patent Number: 4,966,398

[45] Date of Patent: Oct. 30, 1990

[54] FLUID CONDUIT COUPLING

[75] Inventor: Francis C. Peterson, Woodbury, Conn.

[73] Assignee: Buell Industries, Inc., Waterbury, Conn.

[21] Appl. No.: 310,838

[22] Filed: Feb. 14, 1989

[51] Int. Cl.⁵ ............................................. F16L 39/00
[52] U.S. Cl. ................................... 285/319; 285/316; 285/320; 285/33; 285/924
[58] Field of Search ................. 285/319, 316, 33, 320, 285/924, 317, 305, 308, 345, 277

[56] References Cited

U.S. PATENT DOCUMENTS

| | | | |
|---|---|---|---|
| 1,565,349 | 12/1925 | Zerk | 285/316 |
| 1,820,703 | 8/1931 | Hungerford | 285/315 |
| 2,468,847 | 6/1947 | Trainor | 285/174 |
| 2,667,371 | 1/1954 | Holte | 285/316 X |
| 2,877,437 | 3/1959 | Flanagan | 285/316 X |
| 3,680,033 | 7/1972 | Kawai | 285/316 X |
| 4,035,005 | 7/1977 | DeVincent | 285/319 |
| 4,036,515 | 7/1977 | Karcher | 285/315 |
| 4,055,359 | 10/1977 | McWethy | 285/39 |
| 4,275,907 | 6/1981 | Hunt | 285/18 |
| 4,401,326 | 8/1983 | Blair | 285/318 |
| 4,487,437 | 12/1984 | Dickirson | 285/319 |
| 4,508,369 | 4/1985 | Mode | 285/39 |
| 4,632,434 | 12/1986 | Proctor | 285/39 |
| 4,691,943 | 8/1987 | DeLand | 285/315 |
| 4,783,101 | 11/1988 | Peterson | 285/319 |

FOREIGN PATENT DOCUMENTS

| | | | |
|---|---|---|---|
| 0832973 | 3/1952 | Fed. Rep. of Germany | 285/320 |
| 1934947 | 1/1971 | Fed. Rep. of Germany | 285/316 |
| 2291438 | 6/1976 | France | 285/924 |
| 0278093 | 12/1951 | Switzerland | 285/320 |
| 0887874 | 12/1981 | U.S.S.R. | 285/33 |

Primary Examiner—Randolph A. Reese
Assistant Examiner—Carol I. Bordas
Attorney, Agent, or Firm—St. Onge Steward Johnston & Reens

[57] ABSTRACT

A fluid conduit coupling adapted for quick connect and disconnect without special tools, and in which a safety latch is provided, comprises a first coupling body having a flanged end; a second coupling body sized and adapted to be joined with the first coupling body; a jacket mounted on the first coupling body and radially spaced apart therefrom; and a resilient locking element attached to the second coupling body and having fingers sized to fit into the space between the jacket and the first coupling body which have angular unions which engage the flanged end of the first coupling body when the coupling bodies are fitted together.

5 Claims, 6 Drawing Sheets

FLUID CONDUIT COUPLING

FIELD OF THE INVENTION

The present invention relates to a quick connect fluid conduit coupling used for joining hoses, gasoline lines, air conditioning lines, hoses and other fluid conduits where a pressure and temperature resistant connection is desired.

BACKGROUND OF THE INVENTION

Quick connect fluid conduit couplings for conduits containing, inter alia, fuel, hydraulic fluid, or air conditioning fluids are often employed in the manufacture of automobiles to permit the rapid connection of various components and subassemblies of an automobile during final assembly. Such fluid conduit couplings are required to lock together and to have high resistance to separation caused by internal pressure, temperature, or impact It is desireable that the fluid conduit coupling be connected together without special tools or sealants, i.e., it must snap together. It is also desireable that the coupling be disconnected manually without special tools. In addition, the fluid conduit coupling must be capable of several connection/disconnection cycles. It is also desireable that such a fluid conduit coupling have a redundant lock feature in case the primary lock fails or is not made.

Various designs for quick connect fluid conduit couplings have been proposed. U.S. Pat. No. 4,055,359 to McWethy discloses one such quick connect coupling, in which a cage containing a garter spring is located around a male coupling, and which receives the flared end of a female coupling when the male and female couplings are fitted together. The garter spring slips over the flared end and prevents the coupling from being pulled apart by locating against the cage. However, the McWethy fluid conduit coupling structure requires a special annular tool to disconnect the coupling, and further, has no redundant safety lock.

U.S. Pat. No. 4,691,943 to DeLand discloses a quick connect coupling in which a female coupling has a cage extending from its end. The cage contains barbs which extend inwardly and towards the female coupling. A male coupling fits inside the cage and has protruberances which are engaged by the barbs. Deland also requires an annular tool to disconnect the coupling, and lacks a redundant safety lock.

SUMMARY OF THE INVENTION

It is an object of the present invention to provide a quick connect and disconnect fluid conduit coupling that may be easily connected and disconnected without special tools. It is a further object of the invention to provide a quick connect coupling that resists high internal pressures, high temperatures, pull apart pressures, and which is impact resistant. It is another object of the invention to provide a fluid conduit coupling in which the coupling parts may be connected together with a minimum likelihood of misalignment which might cause a poor seal or a insecure locking together. It is yet another object of the invention to provide a quick connect fluid conduit coupling with a redundant locking feature to prevent separation where the primary lock is not made, or where it fails.

A coupling for connecting a pair of fluid conduits in accordance with the invention generally comprises: a first coupling body having a flanged end, and which is adapted to be attached to one of the conduits; a second coupling body adapted to be joined with the first coupling body and to be attached to the other of the conduits; a jacket mounted on and being axially moveable relative to the first coupling body, having an open end directed towards the flanged end of the first coupling body, the jacket surrounding the first coupling body with a space therebetween; and a resilient locking means mounted on the second coupling body adapted to engage the flanged end of the first coupling body. The locking means advantageously comprises a resilient locking element, mounted on the second coupling body, having at least two fingers each having (a) an inwardly directed segment directed toward the second coupling body, (b) an axially directed segment directed along the second coupling body and adapted for insertion in said jacket open end, and (c) an angular union between the inwardly directed segment and the axially directed segment, the angular union being sized and adapted to engage the flanged end of the first coupling body.

Preferably the first coupling body comprises a female coupling body, and the second coupling body comprises a male coupling body. Spring means biased to position the jacket relative to the first coupling body with the jacket open end adjacent to the first coupling body flanged end are advantageously provided. Preferably, the jacket comprises: a tubular collar having an outwardly directed flange at its end located closest the first coupling body flanged end which is adapted to be mounted fixedly on the first coupling body; a moveable tubular shell having an inwardly directed flange, adapted to engage the collar flange, located at its end furthest away from the first coupling body flanged end, and having a flared open end closest the first coupling body flanged end, the shell being radially spaced apart from the first coupling body to form the space between the jacket and the first coupling body; and a coil spring located around the first coupling body and inside of the shell, having one end engaging the shell and one end engaging the collar, which is biased to locate the shell flared open end adjacent to the first coupling body flanged end. Most preferably, there are four of the fingers, comprising alternately located shorter and longer fingers. It is desireable that the longer fingers have offset segments for lengthening the longer fingers.

Sealing means such as resilient polymeric O-rings are located between the first coupling body and the second coupling body for sealing the coupling bodies.

The fluid conduit coupling may be secured together by moving the jacket away from the flanged end of the first coupling body, fitting together the first and second coupling bodies with the fingers located adjacent the coupling bodies, releasing the jacket so that the spring means locates the jacket in its biased position, with the fingers located inside the space inside the jacket, such that the second and first coupling bodies resist separation by the engagement of the angular unions with the flanged end of the first coupling body. The fingers are prevented from escaping from their separation resisting position by the jacket. The coupling may be disconnected by moving the jacket away from the flanged end of the first coupling body and pulling the first and second coupling bodies apart when the fingers are released from the space between the jacket and the first coupling body.

Other objects, aspects and features of the present invention in addition to those mentioned above will be pointed out in detail or will be understood from the following detailed description provided in conjunction with the accompanying drawings.

BRIEF DESCRIPTION OF THE DRAWINGS

FIG. is a partial cross-sectional view along the line 2—2 of FIG. 1.

DETAILED DESCRIPTION OF THE INVENTION

Figure 1:
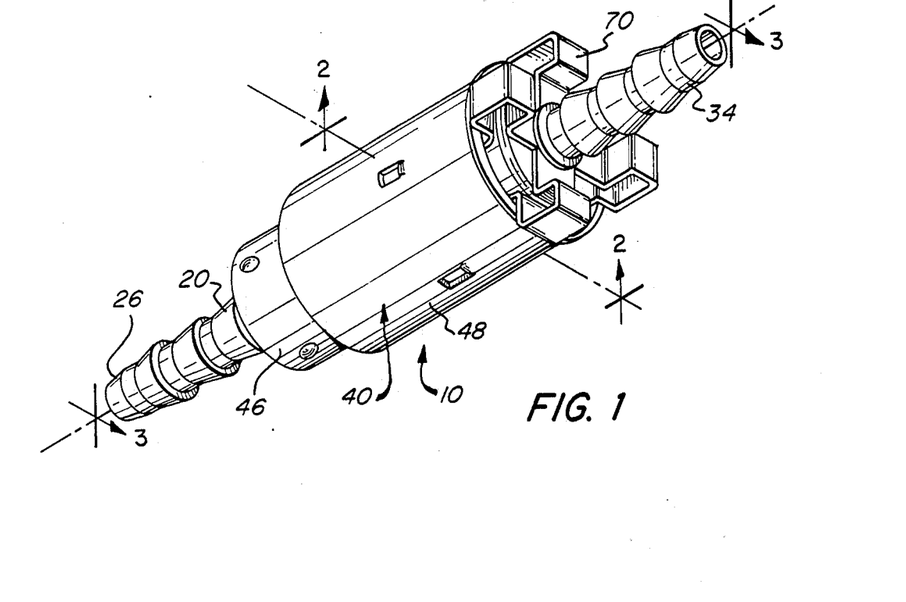
FIG. 1 is a perspective view of an assembled fluid conduit coupling of the present invention.
Figure 2:
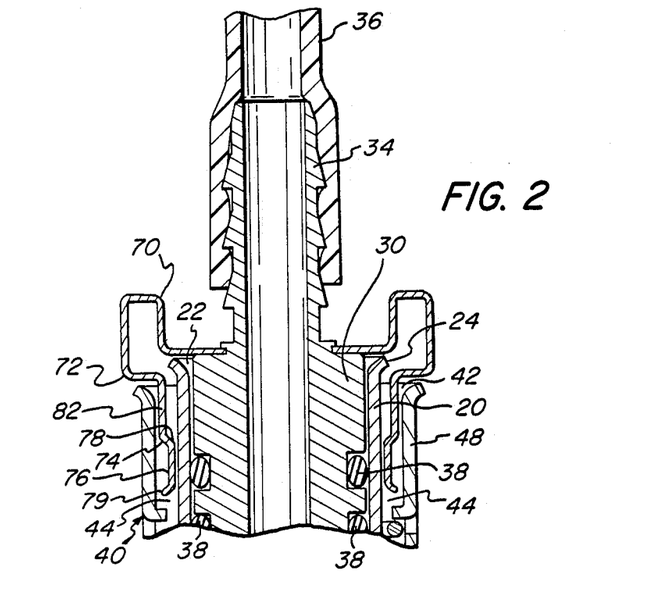
Figure 3:
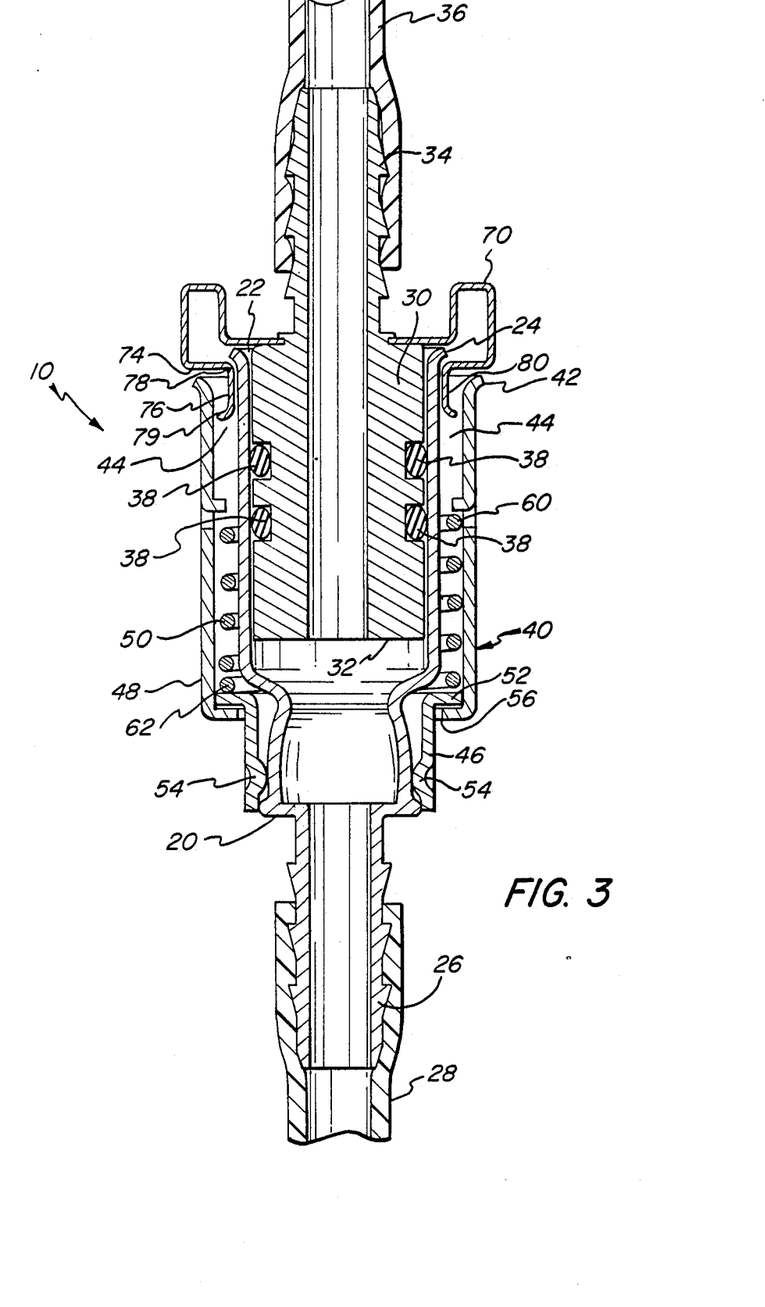
FIG. 3 is a cross-sectional view along the line 3—3 of FIG. 1.
Figure 4:
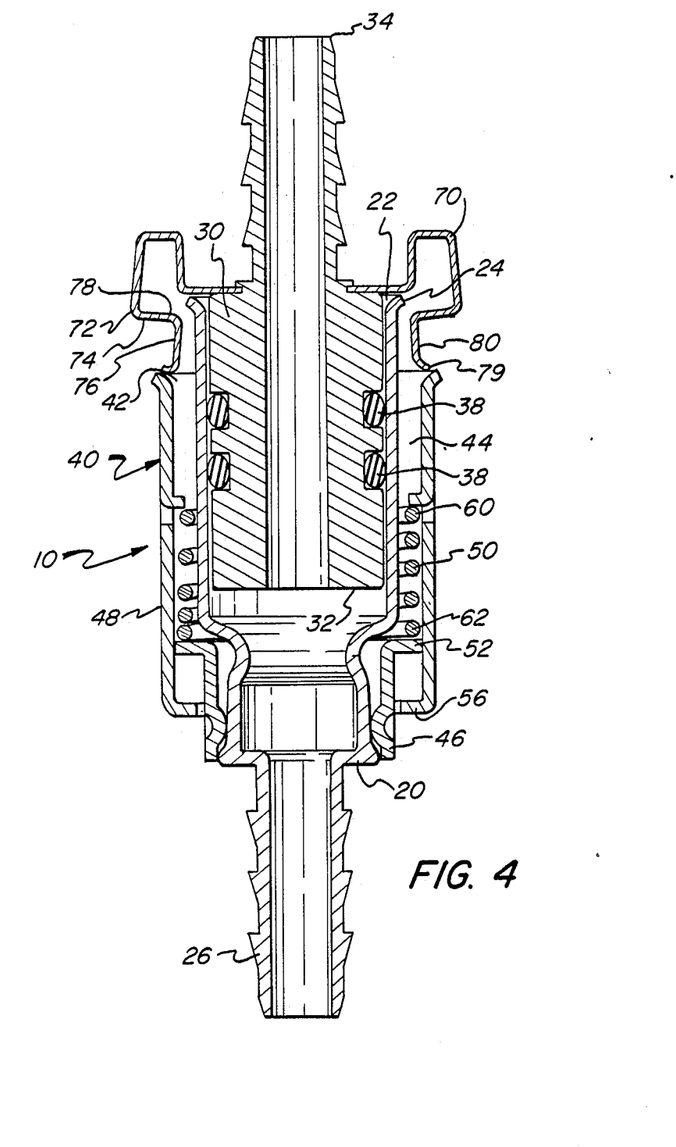
FIG. 4 is the cross-sectional view of FIG. 3 with the coupling male and female bodies partially disassembled.

Referring now to FIGS. 1-3, the fluid conduit coupling of the present invention, shown generally at 10, comprises a first coupling body, shown as female coupling body 20, having an open end 22 with a flange 24 extending radially outwardly. Female coupling body 20 has an end 26 sized and adapted to be attached to a conduit 28, for example, by being formed into a push-on hose fitting.

A second coupling body, shown as male coupling body 30 has an inserting end 32 sized and adapted to be inserted into open end 22 of female coupling body 20. Male coupling body 30 has another end 34 sized and adapted to be connected to another conduit 36.

Sealing means are located between male coupling body 30 and female coupling body 20 to provide a seal against fluid leakage when they are fitted together. Preferably, the sealing means comprises resilient polymeric O-rings 38 fitted into channels formed in male coupling body 30.

A jacket, generally indicated at 40, is mounted on and is axially moveable relative to female coupling body 20. Jacket 40 has an open end 42 directed towards flanged end 22 of female coupling body 20. Jacket 40 surrounds female coupling body 20 at a radial distance such that a space 44 is located between the jacket 40 and female coupling body 20.

Jacket 40 preferably comprises a collar 46, a shell 48, and a coil spring 50. Collar 46 is tubular and has an outwardly directed flange 52 at its end located closest female coupling body flanged end 22, and is adapted to be mounted fixedly on the female coupling body, for example, by detents 54, which center and hold collar 46 radially apart from the female coupling body 20. Shell 48 is tubular and moveable relative to the collar 46 and provides the part of jacket 40 which is moveable relative to the female coupling 20. Shell 48 has an inwardly directed flange 56 adapted to engage collar flange 52. Flange 56 is located at the end of shell 48 which is furthest away from female coupling body flanged end 22. Shell 48 has a flared open end 42 closest female coupling body flanged end 22. Shell 48 is radially spaced apart from female coupling body 20 to form space 44 between jacket 40 and female coupling body 20. Coil spring 50 is located around female coupling body 20 and inside of shell 48. One end 60 of spring 50 engages shell 48 and one end 62 of spring 50 engages collar 46. Spring 50 is biased to locate shell flared open end 42 adjacent to female coupling body flanged end 22.

A resilient locking element 70 is mounted on male coupling body 30. Locking element 70 is generally cross-shaped in plan view, and has at least two, and preferably four fingers 72 adapted to be fitted into the space 44 when male and female coupling bodies 20 and 30 are fitted together. Each finger 72 comprises an inwardly directed segment 74 directed toward male coupling body 30, an axially directed segment 76 directed along male coupling body 30 toward inserting end 32, and an angular union 78 between inwardly directed segment 74 and axially directed segment 76, angular union 78 being sized and adapted to engage flanged end 22 of female coupling body 20. In the preferred embodiment, inwardly directed segments 74 are sized to locate axially directed segments 76 adjacent the outer surface of female coupling body 20 when male coupling body 30 and female coupling body 20 are fitted together, and axially directed segment 76 is sized and adapted for insertion into jacket open end 42 to fit inside space 44. It is desireable that each finger 72 have a radially outwardly extending curved tip segment 79 located at its end.

Figure 5:
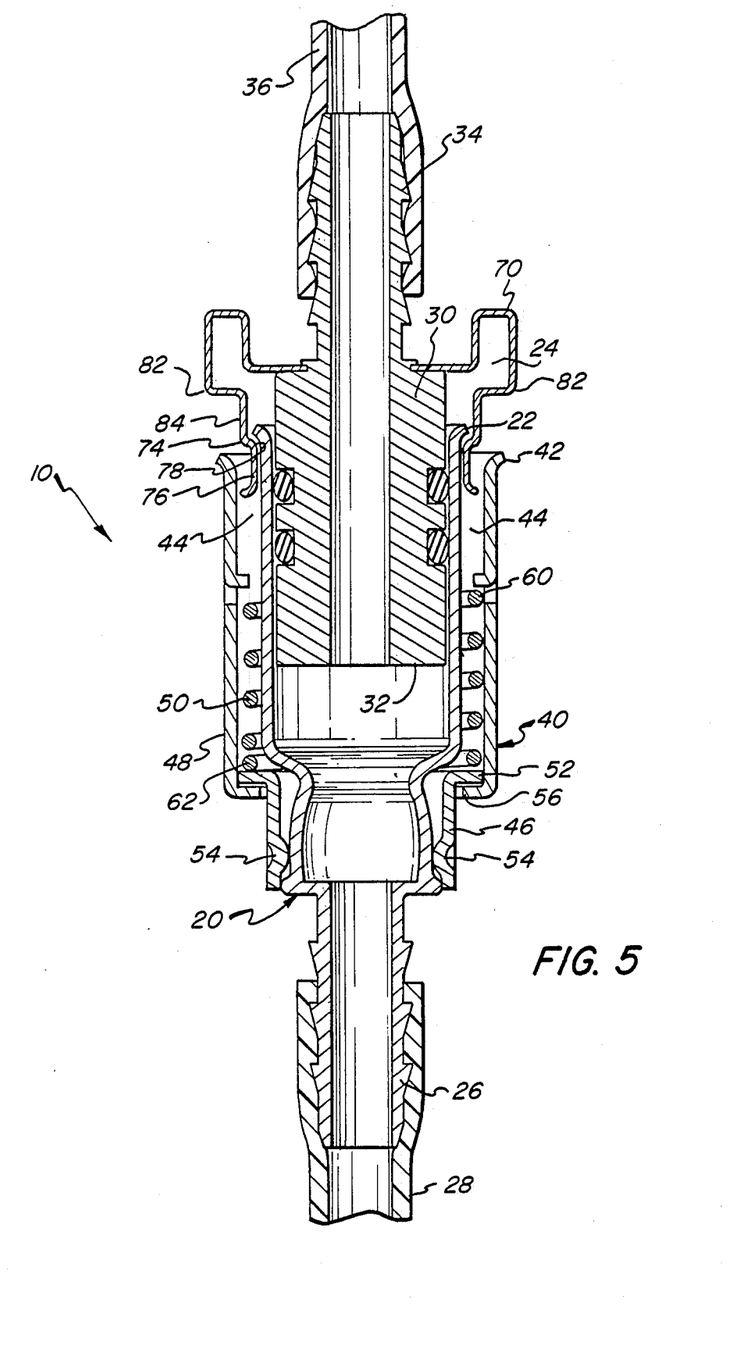
FIG. 5 is the cross-sectional view along the line 2—2 of FIG. 1 with the coupling male and female bodies partially disassembled.
Figure 6:
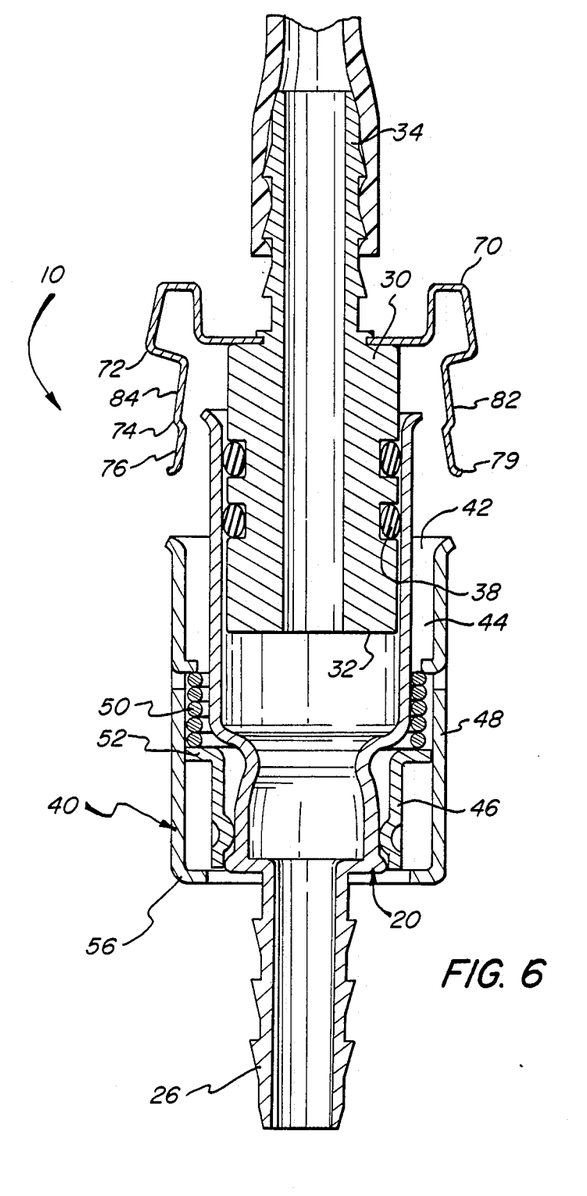
FIG. 6 is the cross-sectional view of FIG. 5 with the coupling male and female bodies unlocked and partially disassembled.

In the preferred embodiment, there are two shorter fingers 80 alternately located with two longer fingers 82. Longer fingers 82 have offset segments 84 for positioning their inwardly directed segments 74 and axially directed segments 76 closer to inserting end 32 of male coupling body 30 than the inwardly directed segments 74 and axially directed segments 76 of shorter fingers 80. The longer fingers 82 serve as a redundant safety lock mechanism in case the shorter fingers 80 do not lock, or are disengaged. This redundant locking effect is seen in FIG. 5, where even if the shorter fingers 80 are not engaging flanged end 22, longer fingers 82 are still available to make the engagement.

It is desireable, to minimize the volume of the coupling that the axially directed segments 76 are substantially parallel to male coupling body 30, and inwardly directed segments 74 are substantially perpendicular to male coupling body 30.

The resilient locking element 70 preferably comprises spring steel, and may be made by stamping and bending spring steel. The male and female coupling bodies 20 and 30 are preferably formed from stainless steel by cold forming processes. The shell 48 and collar 46 of jacket 40 are also preferably formed of stainless steel by cold heading.

The fluid conduit coupling 10 of the present invention can be used to quickly connect two such conduits on which the female coupling body 20 and male coupling body 30 are mounted by moving shell 48 away from flanged end 22 of female coupling body 20, inserting male coupling body 30 inside female coupling body 20 with fingers 72 located adjacent female coupling body 20, and releasing shell 48 so that the coil spring 50 locates shell 48 in its biased position with fingers 72 located inside space 44 between shell 48 and female coupling body 20. Separation of male and female coupling bodies 20 and 30 is resisted by the engagement of angular unions 78 with flanged end 22 of female coupling body 20. Fingers 72 ar prevented from radial outward movement out of their locking position by shell 48, so that the coupling 10 is safely locked together. The locking action of the shorter fingers 80 is seen in FIG. 3. The locking effect of the longer fingers 82 is seen in FIG. 5.

The fluid conduit coupling 10 may be disconnected by moving shell 48 away from flanged end 22 of female coupling body 20 and pulling female coupling body 20 and male coupling body 30 apart when fingers 72 are released from space 44 between shell 48 and female coupling body 20. It is to be appreciated that these disconnections can be made manually, without special tools.

Figure 7:
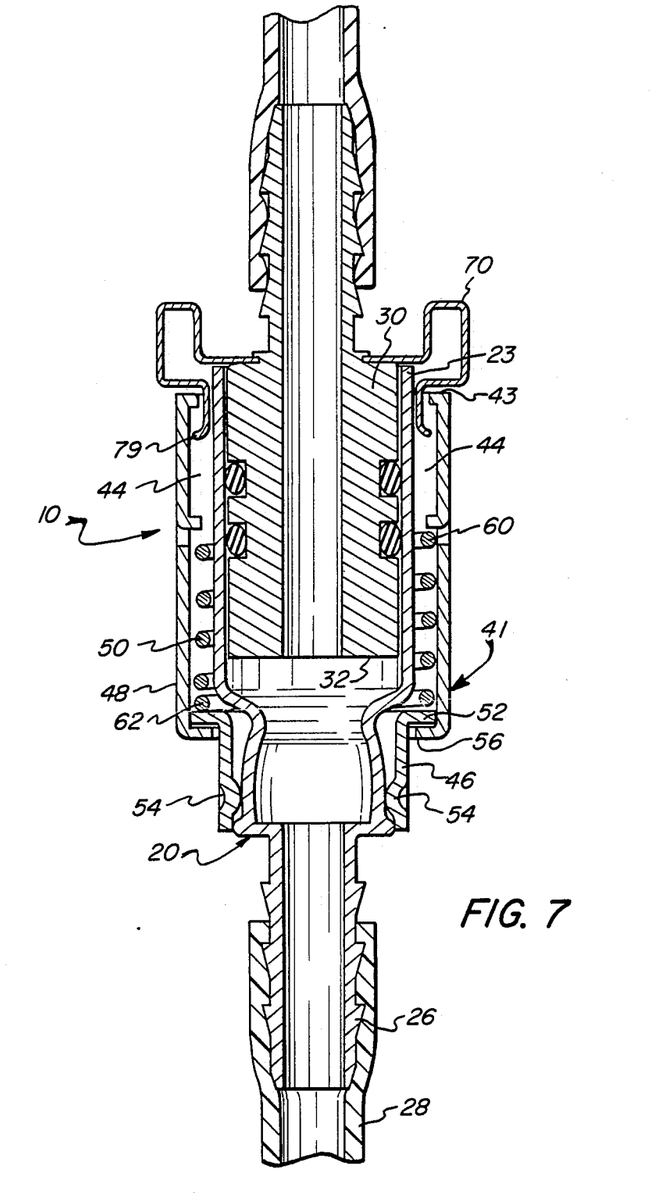
FIG. 7 is a cross-sectional view of an alternative embodiment of the invention.

An alternative embodiment of the invention is shown in FIG. 7. The alternative embodiment is identical or similar in most of its elements to the embodiment described above, and the elements are identified by the same reference numerals as described above. The alternative embodiment modifies the prior disclosure by providing a inwardly directed flanged end 43 on the open end the jacket 41. The open end 23 of the coupling 20 lacks the outwardly directed flange 24 although this flange may also be included for a redundant safety locking feature. The jacket 40 may be fixed in place on the female coupling 20, and may comprise an integral piece which does not move relative to any other part. The spring element 70 serves to lock the male and female couplings together by the engagement of tips 79 on inwardly directed flange 43 when they are connected together.

Accordingly, the present invention provides an improved fluid conduit coupling having a redundant safety look, and which may be connected and disconnected without special tools, and thus improves over the art.

I claim:

1. A coupling for connecting a pair of fluid conduits, comprising:
   a female coupling body having a flanged open end;
   a male coupling body having an inserting end sized to be inserted into said open end of said female coupling body;
   a jacket mounted on said female coupling body having an open end directed towards said flanged end of said female coupling body, said jacket surrounding said female coupling body with a space therebetween, and being axially moveable relative thereto;
   means biased to position said jacket relative to said female coupling body with said jacket open end adjacent to said female coupling body flanged end; and
   a resilient locking element mounted on said male coupling body including
   (a) two shorter fingers each having
       (i) an inwardly directed segment directed toward said male coupling body,
       (ii) an axially directed segment directed along said male coupling body toward said inserting end, said axially directed segment being sized and adapted for insertion into said jacket open end and to fit inside said space between said jacket and said female coupling body, and
       (iii) an angular union between said inwardly directed segment and said axially directed segment, said angular union being sized and adapted to engage said flanged end of said female coupling body, and
   (b) two longer fingers each having
       (i) an offset segment directed along said male coupling body towards said inserting end of said male coupling body which is adapted for insertion into said jacket open end and to fit inside said space between said jacket and female coupling body,
       (ii) an inwardly directed segment directed toward said male coupling body connected to said offset segments,
       (iii) an axially directed segment directed along said male coupling body toward said inserting end thereof, said axially directed segment being sized and adapted for insertion into said jacket open end and to fit inside said space between said jacket and said female coupling body, and
       (iv) an angular union between said longer finger inwardly directly segment and said longer finger axially directed segment, said angular union being sized and adapted to engage said flanged end of said female coupling body, and
   (c) spring means for permitting limited axial movement of said coupling bodies relative to each other and for resiliently resisting pull apart forces on said coupling when said coupling bodies are secured together;
   whereby said coupling may be secured together by moving said jacket away from said flanged end of said female coupling body, inserting said male coupling body inside said female coupling body with said shorter and longer fingers located adjacent said female coupling body, releasing said jacket so that the bias means locates said jacket in its biased position with said shorter and longer fingers located inside said space between said jacket and said female coupling body such that said male and female coupling bodies resist separation by the engagement of said angular unions with said flanged end of said female coupling body and said fingers are prevented from radial outward movement by said jacket, and whereby said coupling may be disconnected by moving said jacket away from said flanged end of said female coupling body and pulling said female coupling body and said male coupling body apart when said fingers are released from said space between said jacket and said female coupling body.

2. A coupling in accordance with claim 1, further comprising sealing means located between said male coupling body and said female coupling body for sealing said coupling bodies.

3. A coupling in accordance with claim 2 wherein said sealing means comprises resilient polymeric O-rings fitted into channels formed in said male coupling body.

4. A coupling in accordance with claim 1, wherein said jacket comprises:
   a tubular collar having an outwardly directed flange at its end located closest said female coupling body flanged end, and which is adapted to be mounted fixedly on said female coupling body;
   a moveable tubular shell having an inwardly directed flange, adapted to engage said collar flange, located at its end furthest away from said female coupling body flanged end, and having a flared end closest said female coupling body flanged end, said shell being radially spaced apart from said female coupling body to form said space between said jacket and said female coupling body; and a coil spring located around said female coupling body and inside of said shell, having one end engaging said shell and one end engaging said collar, and being adapted to bias said shell towards said flanged end of said female coupling body.

5. A coupling in accordance with claim 1 wherein said offset segments of said longer fingers are longer than or equal to the axial length of said inwardly directed segments and axially directed segments of said shorter fingers.

* * * * *